(12) United States Patent
Mundhenke et al.

(10) Patent No.: US 6,450,740 B1
(45) Date of Patent: Sep. 17, 2002

(54) MECHANICAL GEAR HOB WITH STOCK DIVIDE BY DIFFERENTIAL GEAR BOX

(75) Inventors: David Dean Mundhenke; Steven Marc Klabunde, both of Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/556,220

(22) Filed: Apr. 24, 2000

(51) Int. Cl.[7] .............................. B23F 5/14; B23Q 15/26
(52) U.S. Cl. ............................. 409/12; 409/11; 409/15; 409/26; 409/61; 451/5; 451/219
(58) Field of Search .................. 409/12, 26, 51, 409/61, 11, 15, 38; 451/5, 219; 700/164; 318/603

(56) References Cited

U.S. PATENT DOCUMENTS

| | | | | |
|---|---|---|---|---|
| 4,178,537 A | * | 12/1979 | Angst | 318/603 |
| 4,253,050 A | * | 2/1981 | Angst | 409/12 |
| 4,329,096 A | * | 5/1982 | Herscovici | 409/15 |
| 4,587,766 A | * | 5/1986 | Miyatake et al. | 451/219 |
| 4,657,447 A | | 4/1987 | Faulstich et al. | 409/12 |
| 4,708,544 A | * | 11/1987 | Faulstich et al. | 409/12 |
| 4,755,950 A | * | 7/1988 | Rao | 700/164 |
| 4,902,175 A | * | 2/1990 | Faulstich | 409/12 |
| 5,175,962 A | * | 1/1993 | Pedersen | 451/5 |
| 5,228,814 A | | 7/1993 | Suwijn | 409/12 |
| 5,292,212 A | | 3/1994 | Taylor | 409/61 |

FOREIGN PATENT DOCUMENTS

| | | | | |
|---|---|---|---|---|
| DE | 3642162 | * | 6/1987 | 409/12 |
| JP | 0037284 | * | 3/1977 | 409/12 |
| JP | 0046587 | * | 4/1977 | 409/12 |
| JP | 0134128 | * | 10/1981 | 409/12 |
| WO | 80 00321 | * | 3/1980 | 409/12 |

* cited by examiner

Primary Examiner—William Briggs

(57) ABSTRACT

A mechanical gear hob is equipped with an automatic stock divide device that enables the hob to cut or re-cut gear parts that already have teeth in them by automatically synchronizing the gear teeth to the hob cutter. The hob is equipped with a hob shift position sensor and a hob cutter rotary position sensor to input to a controller the lateral and rotary positions of the hob cutter. A stock divide sensor is mounted adjacent the worktable to determine the location of the gear teeth previously formed in the workpiece. A servomotor is mounted to the differential input shaft in the hob drive train and has a rotary position feedback to the controller as well. Stock divide is accomplished by an input to the differential, causing the workpiece to rotate relative to the hob cutter to bring the existing teeth on the workpiece into phase with the teeth of the hob cutter.

7 Claims, 3 Drawing Sheets

MECHANICAL GEAR HOB WITH STOCK DIVIDE BY DIFFERENTIAL GEAR BOX

BACKGROUND OF THE INVENTION

1. Field of the Invention

The present invention relates to a mechanical gear hob machine having an automatic stock device to enable the hob to cut or re-cut gear parts that already have teeth by automatically synchronizing the workpiece teeth with the hob cutter.

2. Description of the Related Art

In the hobbing process, a rotating, generally cylindrical shaped tool having helically arranged cutting surfaces is brought into contact with the rotating workpiece, generally a gear blank. In spur gear hobbing, the tool and workpiece rotate in a timed relationship as though the workpiece were a gear rotating in mesh with a worm gear represented by the hob cutter. When helical gears are hobbed, the timed relationship is different. A supplemental rate of motion is applied to the workpiece, either advancing or retarding the workpiece rotation relative to the hob cutter vertical position, in order to develop the appropriate helix angle across the face width of the gear being machined. Hobbing is primarily used for producing spur and helical gears, however, the hobbing process may also produce other products.

A typical mechanical gear hob rotates the hob cutter about a generally horizontal axis while the workpiece is rotated about a vertical axis. A main drive motor rotates both the hob cutter and the workpiece through a complex drive train in a synchronized motion so that the workpiece is rotated in phase with the hob cutter. In addition, the hob cutter and workpiece can move vertically relative to one another to cut across the entire face width of the workpiece.

A differential in the hobbing machine is used to take input from the vertical feed drive and add a portion of it to the drive train connecting the hob cutter spindle to the worktable. This device has been used to simplify the production of helical gears. For cutting helical gears, the timed relationship of the hob cutter to the workpiece is slightly advanced or retarded as the hob cutter moves vertically along the face width of the workpiece. For cutting spur gears, the differential is "locked-out", which involves removing the differential change gears and holding the feed drive input to the differential in place, i.e.—no rotation is allowed. There is no input into the differential and the hob cutter forms a spur gear having straight teeth parallel to the gear axis.

Mechanical gear hobs cannot cut gears from parts that already have teeth, such as oversized parts or near-net gear forgings, without the operator first aligning the teeth of each gear to the teeth of the hob cutter before starting the machine. This manual stock divide procedure is slow and tedious and does not work with hobs that have automatic part loaders.

Automatic stock divide can be performed on a computer numerical controlled (CNC) gear hob machine. A CNC machine has separate drives for the hob cutter rotation, hob cutter shift, workpiece rotation, etc. A controller operates all of the various drives to coordinate the machine operation. A CNC hob machine is much more expensive than a mechanical hob and has capabilities that exceed what is need for gear hobbing with automatic stock divide. Existing mechanical hob machines can be retrofitted to CNC control at less expense than a new CNC machine, but are still an expensive solution for the purpose of adding an automatic stock divide feature to a hob.

SUMMARY OF THE INVENTION

The present invention provides an automatic stock divide device that can be adapted to mechanical gear hobs at significantly less cost than a CNC retrofit of the hob machine. This will allow the hob to cut or re-cut gear parts that already have teeth in them by automatically synchronizing the gear teeth with the cutter. A servomotor coupled to the differential input shaft performs the adjustment. With the workpiece and the hob cutter rotating, an input to the differential causes the workpiece to rotate relative to the hob cutter, to bring the existing teeth on the workpiece into phase with the teeth of the hob cutter. The servomotor utilizes the same differential input shaft used to make helical gears.

To accomplish the stock divide, the hob is equipped with a hob shift position sensor and a hob cutter rotary position sensor. These sensors input to a controller the lateral position of the hob cutter along the cutter axis (hob shift) as well as the rotary position of the hob cutter about the cutter axis. A stock divide sensor is mounted adjacent the worktable to determine the location of the gear teeth previously formed in the workpiece. A servomotor is mounted to the differential change gears and has a rotary position feedback to the controller as well.

The automatic stock divide procedure begins after a workpiece has been mounted to the worktable. The workpiece and the hob cutter are both rotated by the hob drive motor. The stock divide sensor inputs to the controller the workpiece teeth position while the hob shift position sensor and the hob cutter rotary position sensor input to the controller the cutter position. The controller then determines the necessary adjustment in the position of the workpiece relative to the hob cutter to bring the workpiece teeth into phase with the hob cutter. Once the calculation has been performed, the servomotor turns the feed drive input shaft to the differential, causing an adjustment in the workpiece position relative to the hob cutter to bring the workpiece gear teeth into phase with the teeth of the hob cutter.

The automatic stock divide device of the present invention can be added to an automatic loaded mechanical gear hob, allowing nonstop hobbing of near net forgings or oversized parts without the cost of a CNC retrofit of a mechanical gear hob.

DESCRIPTION OF THE PREFERRED EMBODIMENT

Figure 1:
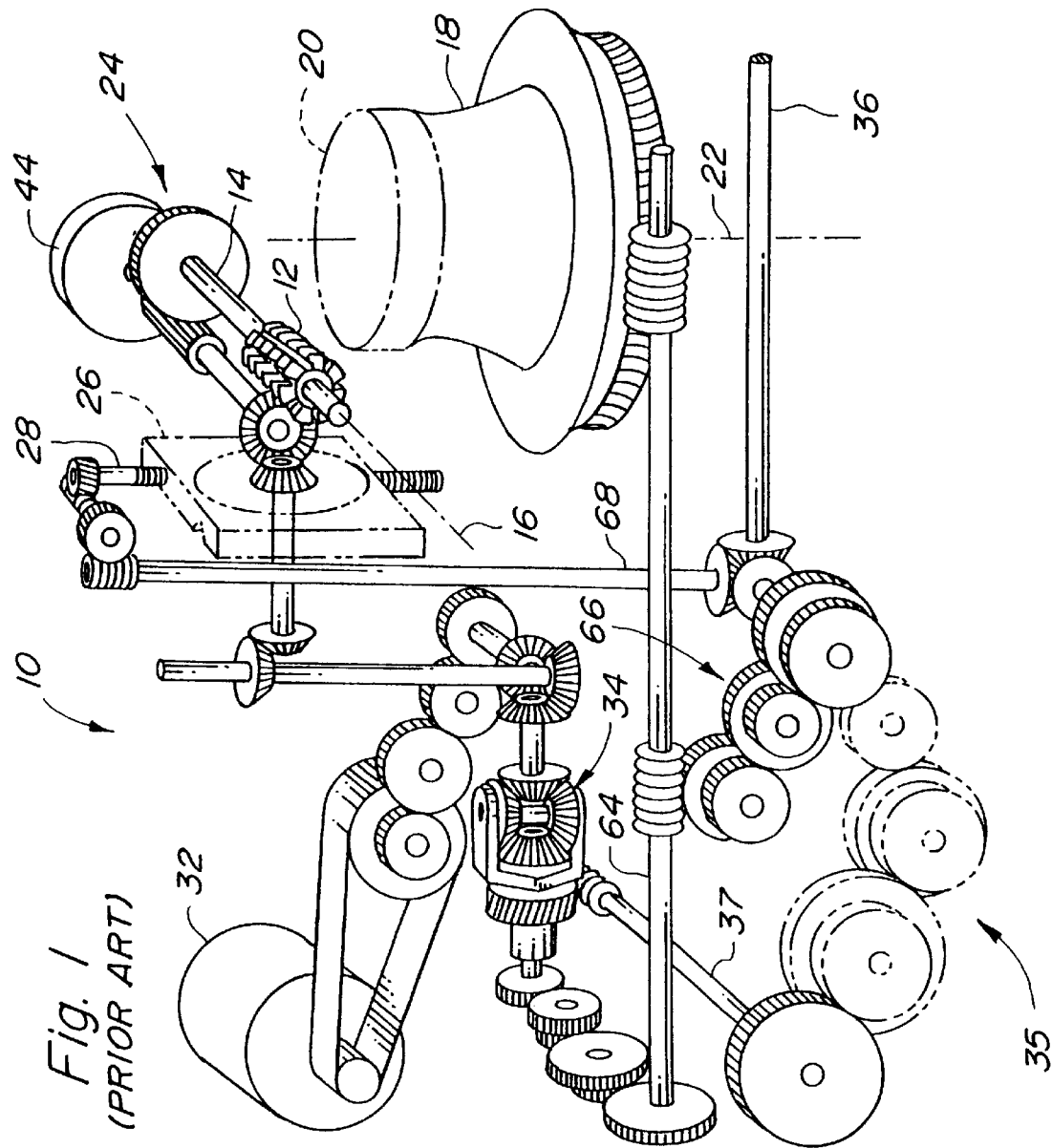
FIG. 1 is a schematic diagram of an exemplary mechanical hob.

A drive train of a representative gear hob is shown in FIG. 1 and designated generally at 10. The gear hob includes a hob cutter 12 carried by a shaft 14 for rotation about a hob axis 16 defined by the shaft 14. The hob further includes a worktable 18 to which a workpiece 20 can be mounted for machining to form a gear. The worktable 18 is rotatable about a workpiece axis 22 that is perpendicular to the hob axis 16.

The shaft 14 is part of a hob head 24 that is carried by a hob slide 26 for movement parallel to the workpiece axis 22 along an axial feed screw 28. This allows the cutter 12 to move vertically and cut teeth across the full width of the workpiece 22.

The hob cutter is also provided with a hob shift device that moves the shaft 14 together with the cutter 12 along the hob axis 16. The hob cutter is shifted between workpieces to enable different portions of the hob cutter to be used during cutting to produce even wear along the length of the cutter 12.

The drive train 10 is powered by a motor 32 and drives both the cutter 12 and the worktable 18. Included in the drive train 10 is a differential 34. The drive train 10 is arranged to maintain the desired relationship between the cutter 12 and the workpiece 20 to generate the desired number of gear teeth on the workpiece. The gears in the drive train are arranged for the specific gear being produced. The shaft 36 drives the radial feedscrew, not shown.

When a helical gear is being produced, differential change gears 35 receive an input from the feed drive shaft 64 and add the input into the differential 34 through the differential input shaft 37. This changes the timed relationship between the cutter and the workpiece, slightly advancing or retarding the workpiece relative to the cutter as the cutter moves across the width of the workpiece. The advancing or retarding of the workpiece relative to the cutter produces a helical gear with teeth inclined to the workpiece axis 22. The feed drive shaft 64 drives the axial feed screw 28 for the hob slide 26 through a gear set 66 and the shaft 68. The gear set 66 also drives the differential change gears 35 so that when cutting a helical gear, the change in the workpiece position relative to the hob cutter is coordinated with the hob slide position. When cutting spur gears, the differential input shaft 37 is "locked-out" which involves removing the differential change gears shown in phantom line and placing a lock on the input shaft 37. This holds the differential input shaft 37 in place, i.e. no rotation is allowed, preventing any input into the differential.

Figure 2:
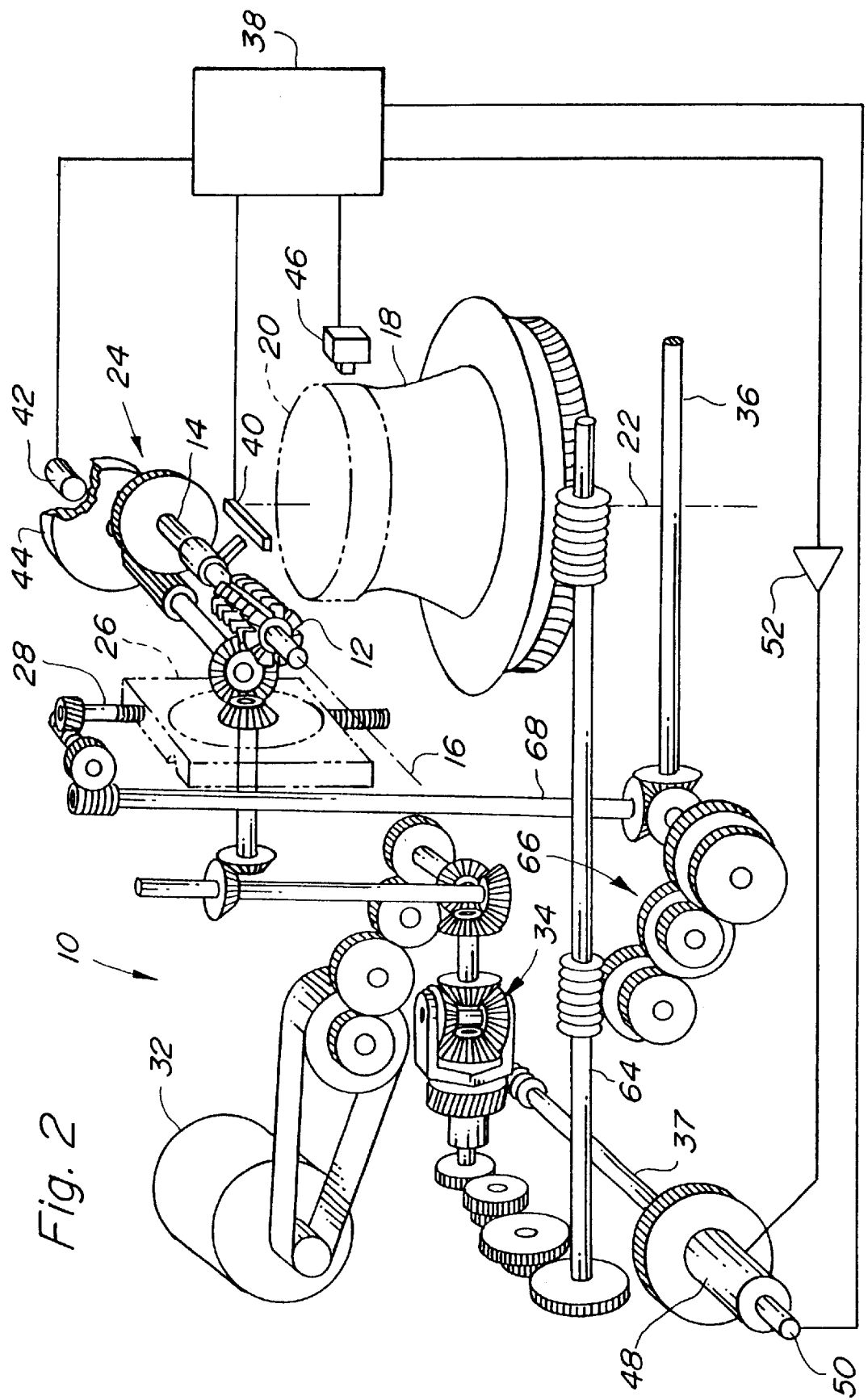
FIG. 2 is a schematic diagram like FIG. 1 showing the gear hob with the stock divide device of the present invention added thereto.
Figure 3:
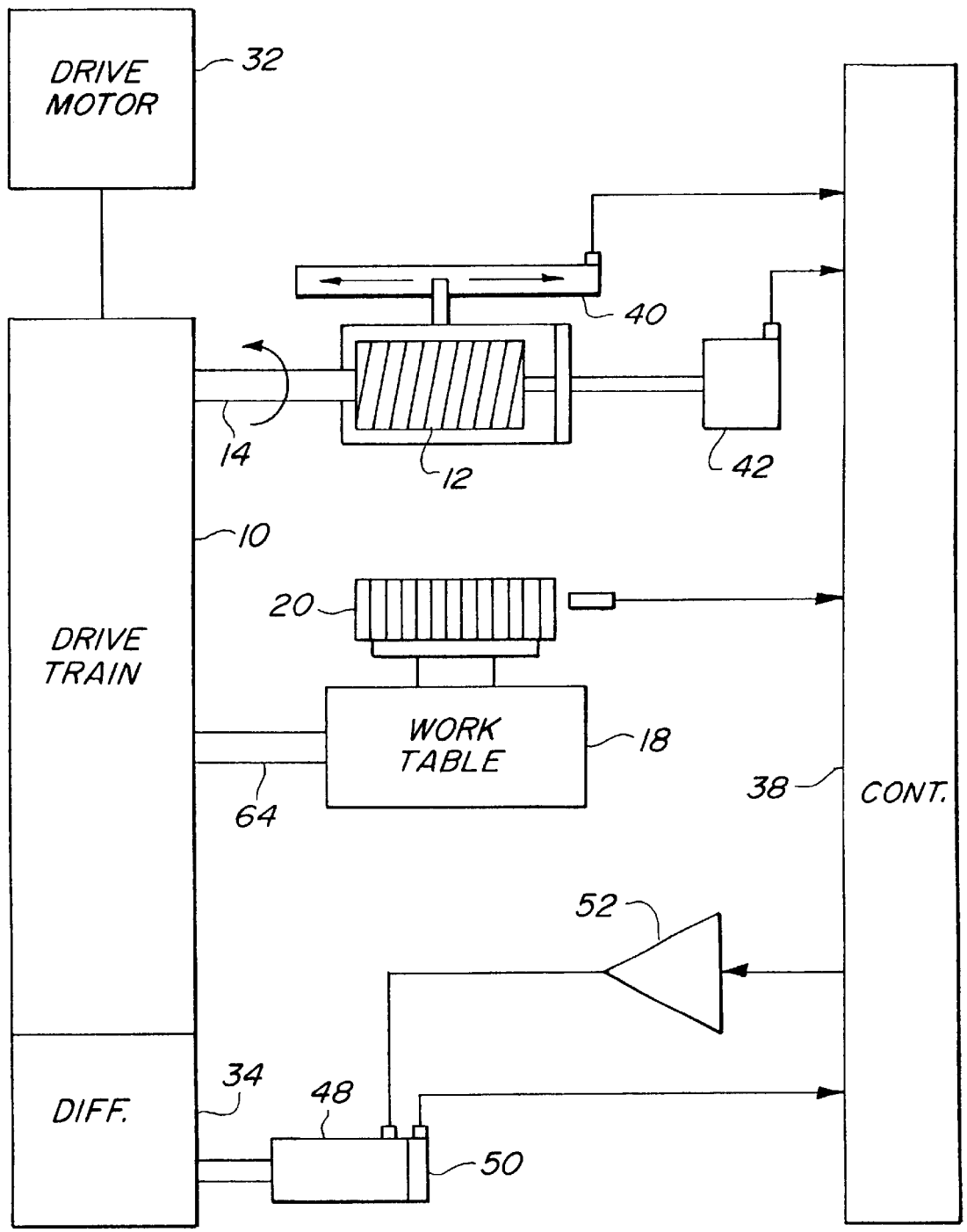
FIG. 3 is a schematic diagram of the gear hob with the stock divide according to the present invention.

The automatic stock divide device of the present invention is shown schematically in FIGS. 2 and 3. FIG. 2 illustrates the drive train shown in FIG. 1 with the additional elements for the automatic stock divide of the present invention. The stock divide includes a hob shift position sensor 40 that provides feedback to an electronic motion controller 38. Also included is a cutter rotary feedback sensor 42 coupled to the flywheel 44. The rotary position of the flywheel correlates directly to the rotary position of the shaft 14. The sensor 42 can be attached to the hob shaft 14 equally well.

A stock divide sensor 46 is provided adjacent the worktable and workpiece 20 to sense the location of the existing teeth in the workpiece. The stock divide sensor is an inductive proximity switch. Other types of proximity switches can be used such as capacitance, ultra-sonic, Hall effect sensors, etc. A servomotor 48 is coupled to the differential input shaft 37 to rotate the shaft and provide a rotary input into the differential as described below. A servomotor position feedback sensor 50 is coupled to the servomotor and provides a feedback of the servomotor position to the controller 38. The sensors 40, 42 and 50 are linear or rotary encoders as required.

After a workpiece 20 has been mounted to the worktable, automatic stock divide is accomplished by operating the drive train 10 to rotate the workpiece 20. The location of the gear teeth on the workpiece is determined by the stock divide sensor 46. At the same time, the hob cutter is rotated while the hob shift and the cutter rotary positions are sensed and inputted to the controller 38. The controller utilizes the workpiece and hob cutter information to determine the relative positions of the cutting teeth of the hob cutter 12 and the location of the teeth on the workpiece 20. The controller 38 then determines the extent to which the workpiece must be rotated, independently of the hob cutter, to place the workpiece and cutter in the proper phase relationship to one another to finish cut the existing teeth in the workpiece. A signal is then sent to the servomotor 48 through an amplifier 52 to provide an input to the differential 34, causing the work table and workpiece to rotate relative to the cutter, thereby moving the cutter and workpiece into the desired phase relationship where the teeth of the cutter are properly aligned with the teeth in the workpiece. Once the stock divide has been accomplished, the servomotor 48 holds the shaft 37 in place, acting as a lock-out used for cutting spur gears to prevent rotation of the differential input shaft while the gear is being cut.

The stock divide procedure is described in greater detail as follows. For a given part set-up, the stock divide must first be referenced prior to automatic stock divide operation. A workpiece with pre-formed teeth is manually referenced with the hob cutter and clamped to the worktable. The main drive motor is "jogged" to turn the hob cutter and the workpiece. When the stock divide sensor senses the first tooth on the workpiece, the hob cutter's rotary and shift position and the workpiece rotary position are all "zeroed". The stock divide is now referenced for this particular workpiece and hob cutter. If either the gear type or the cutter is changed, this reference procedure must be repeated. Furthermore, if the sensors are replaced or moved, this reference procedure must be repeated.

Automatic stock divide is accomplished as follows. When an unfinished near net gear is loaded into the hob, the gear will be out of phase with the hob cutter. When the machine starts, the stock divide sensor begins to measure and record in degrees of hob cutter rotation, how far out of phase each gear tooth is in relation to the hob cutter. The gear will make one revolution so that all of the gear teeth can be measured. The controller will then select the tooth with the farthest out of phase measurement and divide this measurement by the number of teeth on the gear. The amount the gear is out of phase is summed with the extent of the hob shift. The sum is the total amount in degrees that the gear is out of phase with the hob cutter. A corresponding signal is then sent to the servomotor that will turn the differential input shaft 37 the required amount to the rotate the gear relative to the hob cutter and bring the gear teeth and the hob cutter into phase. After the servomotor has made the stock divide correction, the machine will begin cutting the gear.

This device and method for performing stock divide on a mechanical hob machine is less expensive than buying a new CNC gear hob with a stock divide feature. It is also less expensive and less time consuming than a CNC machine retrofit to a mechanical gear hob. Automatic stock divide can be included in a gear hob having an automatic loading device to allow non-stop hobbing of near-net forgings or oversized parts. The stock divide device can be added to existing mechanical gear hobs to increase the productivity of the machine.

The above described embodiment is an automated device that performs the necessary change in the workpiece position relative to the hob cutter. It is possible to perform a manual adjustment by having the controller determine the desired change in position and display a corresponding numerical output to the operator. A manual input crank on the differential input shaft 37 can then be used to perform the adjustment.

The invention should not be limited to the above-described embodiment, but should be limited solely by the claims that follow.

We claim:

1. In a mechanical gear hob machine having a single drive motor powering a hob cutter and a worktable supporting a workpiece in a timed relationship through a drive train having a differential between the drive motor and the worktable, the drive train including a differential input shaft for inputting into the differential a phase change to alter the timed relationship between the hob cutter and the workpiece during gear cutting to produce a helical gear, the improvement comprising an electronic controller, one or more sensors to determine the rotary position of the hob cutter and the hob cutter shift position, a stock divide sensor adjacent the worktable for determining the position of pre-formed teeth in a workpiece and means for inputting into the differential a position change before beginning to cut the workpiece to alter the position of the workpiece relative to the hob cutter to bring the pre-formed gear teeth of the workpiece into phase with the hob cutter.

2. The mechanical gear hob of claim 1 wherein the means for inputting into the differential to alter the position of the workpiece relative to the hob cutter includes a servomotor coupled to the differential input shaft.

3. A gear hob comprising:
    a hob shaft carrying a hob cutter for rotation about a hob axis;
    a work table for supporting a workpiece for rotation about a workpiece axis normal to the hob axis;
    a main drive motor;
    a drive train powered by the main drive motor for rotating the cutter about the hob axis and for rotating the workpiece about the workpiece axis and maintaining the workpiece in phase with the cutter, the drive train including a differential between the main drive motor and the work table; and
    an automatic stock divide device for properly aligning a workpiece having gear teeth in phase with the cutter, the stock divide device including an electronic controller, a cutter rotary feedback sensor, a hob cutter shift position sensor, a stock divide sensor adjacent the work table for determining the position of the teeth in the workpiece, and means for inputting into the differential of the drive train a change in the position of the workpiece relative to the hob to bring the workpiece into the desired phase with the hob.

4. The gear hob as defined by claim 3 wherein the means for inputting into the differential includes a servo motor.

5. The gear hob as defined by claim 4 wherein the servomotor inputs to the differential using a differential input shaft used to change the relationship between the hob cutter and the workpiece during helical gear cutting.

6. A method of performing automatic stock divide on a mechanical gear hob having a hob shaft carrying a hob cutter for rotation about a hob axis, a work table for supporting a workpiece for rotation about a workpiece axis normal to the hob axis, a main drive motor, a drive train powered by the main drive motor for rotating the cutter about the hob axis and for rotating the workpiece about the workpiece axis, the drive train maintaining the workpiece in predetermined relationship with the cutter, the drive train including a differential between the main drive motor and the work table for varying the predetermined relationship between the hob cutter and the workpiece, and an automatic stock divide device for properly aligning a workpiece having gear teeth in phase with the cutter including an electronic controller, a hob cutter rotary feedback sensor, a hob shift sensor, a stock divide sensor for determining the position of the teeth in the workpiece and means for inputting into the differential of the drive train an input to change the position of the workpiece relative to the hob to bring the workpiece into the desired phase with the hob, the method comprising:
    inputting into the controller the rotational position of the cutter;
    inputting into the controller the hob cutter shift position;
    inputting into the controller the rotational position of the workpiece;
    determining a desired phase shift of the workpiece relative to the cutter to bring the workpiece into a proper position relative to the cutter; and
    inputting into the differential the determined phase shift to rotate the workpiece relative to the cutter to bring the gear teeth of the workpiece into the desired relationship with the cutter.

7. The method as defined by claim 6 wherein the input into the differential is accomplished by a servomotor acting on a differential input shaft used to vary the relationship between the hob cutter and the workpiece during helical gear cutting.

* * * * *